Dec. 28, 1948.  V. ALEKS  2,457,624
BICYCLE BASKET
Original Filed Oct. 23, 1942

Inventor:
Vujtant Aleks
By
McCanna, Wintercorn & Morsbach
attys.

Patented Dec. 28, 1948

2,457,624

UNITED STATES PATENT OFFICE 2,457,624

BICYCLE BASKET

Vytant Aleks, Rockford, Ill., assignor to The Washburn Company, Worcester, Mass., a corporation of Massachusetts Original application October 23, 1942, Serial No. 463,102. Divided and this application July 28, 1947, Serial No. 764,188

7 Claims. (Cl. 224—36)

This application is a division of my Patent No. 2,439,376, filed October 23, 1942.

This invention relates to bicycle baskets, and has for its principal object the provision of a supporting bracket adapted for easy application to different makes and styles of handle bars, together with a basket that is adapted for quick and easy attachment to and removal from the bracket so as to permit use of the basket for shopping purposes besides as a carrier basket for the bicycle.

A salient feature of the present invention lies in the fact that an ordinary wicker or other nonmetallic basket equipped with a small slip-on fastener clip of simple and economical sheet metal construction can be applied to a supporting bracket of simple construction, thus reducing the use of critical materials to a minimum. However, it should be understood the invention is not limited to the use of a non-metallic basket.

Another feature of the invention consists in the construction of the supporting bracket using flat strip material, the exposed ends of the strips being rounded so as not to project objectional sharp edges, and the attaching arms made of the strip material being struck to channel-shape cross-section to lend strength and rigidity.

The invention is illustrated in the accompanying drawing, in which

The same reference numerals are applied to corresponding parts throughout the views.

Figure 1:
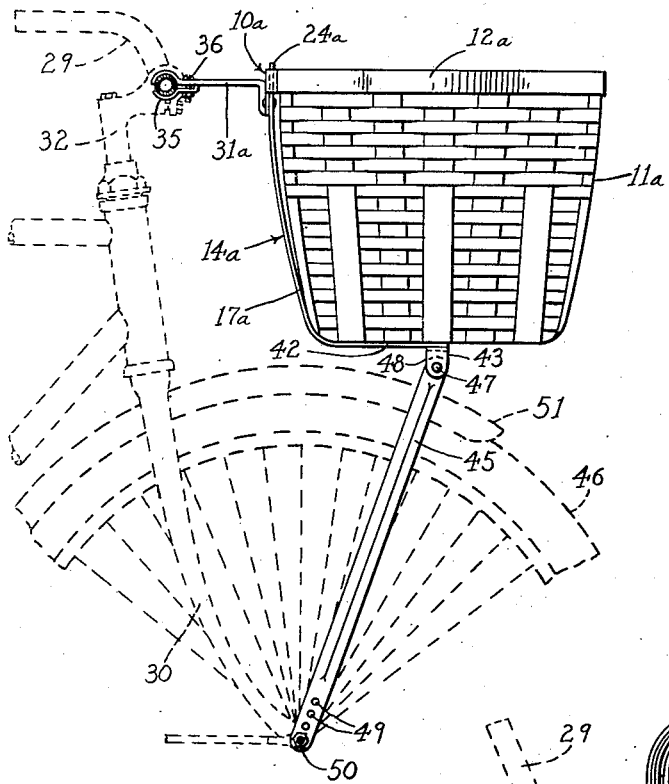
Fig. 1 is a side view of a bicycle basket made in accordance with my invention and indicated in dotted lines the mode of attachment to the bicycle.
Figure 2:
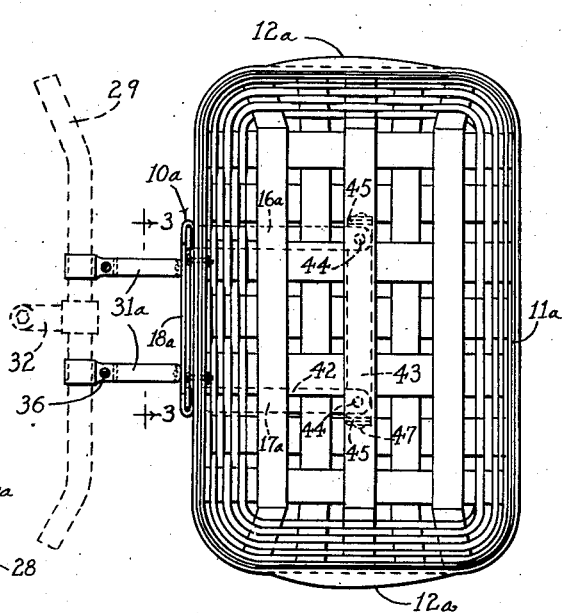
Fig. 2 is a top view of the basket shown in Fig. 1.
Figure 3:
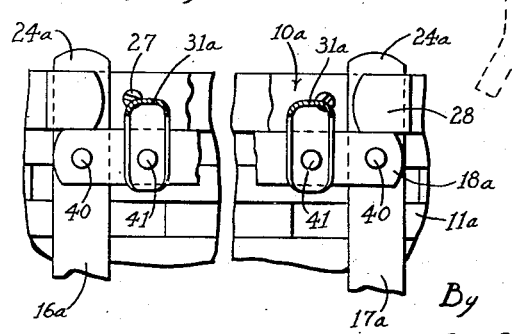
Fig. 3 is a cross-section on an enlarged scale in a vertical plane on the line 3—3 of Fig. 2.

Bicycle baskets are used quite generally for carrying packages, and the bicycle basket of my invention, as stated before, has been designed with a view to easy removal of the basket proper so that it may be used as any ordinary shopping basket, and after the shopping is done is adapted to be replaced on the bicycle easily to serve as a carrier basket. The use of the basket interchangeably in the manner stated has been made practical by reason of the fact that there is only a small and hardly noticeable slip-on fastener clip, indicated generally by the reference numeral 10a, provided on the basket 11a. The latter is of wicker construction, and has fixed handles 12a on the opposite ends thereof. The basket when removed from the bracket on the bicycle serves as any other basket, the clip 10a being not at all objectionable or even noticeable. Of course, the invention is not to be regarded as limited to the use of a nonmetallic basket. The sheet metal clip 10a is adapted to receive the upper end portions 24a of frame members 16a and 17a of a supporting bracket 14a made substantially entirely of sheet metal strip material. The cross-member 18a in this bracket is riveted at its opposite ends to the upright members, as indicated at 40, and has the downwardly bent front ends of the attaching and supporting arms 31a riveted thereto, as indicated at 41, the arms 31a being preferably bent to channel-shaped cross-section, as indicated in Fig. 3, to lend strength and rigidity. The arms 31a are adapted to be clamped to the handle bar 29 at their rear ends on opposite sides of the stem 32 by means of clips 35 and bolts 36. In this construction, however, the members 16a and 17a are bent to generally L-shape to provide a supporting shelf or ledge 42 on the lower end portions thereof on which the bottom of the basket 11a is adapted to rest. A cross-member 43 is riveted to the ends of the members 16a and 17a, as indicated at 44, to keep these lower ends in fixed spaced relation and also provide a place for connection of two supporting legs 45, one on each side of the front wheel 46, the legs 45 being pivotally connected, as at 47, to the downwardly bent ends 48 of the cross-member 43. The lower ends of the legs 45 have holes 49 provided therein in spaced relation for the adjustable connection of the legs 45 with the front axle 50 in a well-known manner, the ends of the axle being entered in a selected hole in each of the two legs to suit the needs of the particular installation, so as to have the supporting shelf 42 on the bracket 14a kept in spaced relation to the front fender 51, or out of contact with the wheel where the fender does not project forwardly to any appreciable extent from the front fork 30.

With this construction, it is apparent that the load is well distributed, and there is not too much strain imposed upon the clip 10a, nor is there any likelihood of the basket being wobbly and rattling when the bicycle is in motion.

It is believed the foregoing description conveys a good understanding of the objects and advantages of my invention. The appended claims have been drawn to cover all legitimate modifications and adaptations.

I claim:

1. A bicycle basket support, comprising an inverted generally U-shaped bracket made from three pieces of narrow sheet metal strip material, namely, two laterally spaced upright members and a cross-member secured to the upright members spaced downwardly from their upper ends, the upper end portions of said upright members above the cross-member defining two fixedly spaced attaching lugs in substantially vertical coplanar relation for connection with a bicycle basket, means connected to and extending rearwardly from the cross-member for detachably fastening the bracket to a bicycle handle-bar in forwardly spaced relation thereto, means connected with the lower ends of the upright members for detachably fastening the same in rigid relation to the legs of a bicycle front fork, and a fastener clip secured on the upper rim portion of a basket and formed to receive the aforesaid attaching lugs for demountably supporting a bicycle basket on said bracket, the cross-member serving to limit downward movement of the fastener clip on said attaching lugs, whereby to support the basket to which the clip is secured.

2. A bicycle basket support as set forth in claim 1, wherein the upright members are bent intermediate their ends to generally L-shape, the lower substantially horizontal portions of said members forming a shelf below and in front of the cross-member on which to rest the bottom of a bicycle basket in its attached position.

3. A bicycle basket support as set forth in claim 1, wherein the upright members are bent intermediate their ends to generally L-shape, the lower substantially horizontal portions of said members forming a shelf below and in front of the cross-member on which to rest the bottom of a bicycle basket in its attached position, said bicycle basket support including a substantially horizontal cross-member connected to and fixedly spacing said horizontally extending portions of said upright members, said cross-member being pivotally connected at its opposite ends with the means for detachably securing the lower ends of said upright members in rigid relation to the legs of a bicycle front fork.

4. A bicycle basket support, comprising an inverted generally U-shaped bracket providing two laterally spaced upright members, a cross-member secured to the upright members spaced downwardly from their upper ends, the upper end portions of said upright members above the cross-member defining attaching lugs in a substantially vertical plane for connection with a bicycle basket, means connected to the cross-member for detachably fastening the bracket to a bicycle handle-bar, means connected to the lower ends of the upright members for detachably fastening the bracket in rigid relation to the legs of a bicycle front fork, and a fastener clip secured to the upper rear portion of a bicycle basket and formed for detachable engagement on the aforesaid attaching lugs for demountably supporting the basket on the bracket, the cross-member serving to limit downward movement of the fastener clip on said attaching lugs, whereby to support the basket to which the clip is secured, and said laterally spaced upright members being further conformed and arranged relative to the cross-member for supporting engagement with the basket below the clip for further support.

5. A bicycle basket support as set forth in claim 4, wherein the upright members are bent so as to provide below the cross-member a rest for supporting engagement with the lower rear portion of the bicycle basket in its attached position.

6. A bicycle basket support as set forth in claim 4, wherein the upright members are bent to substantially L-shape, so as to provide a forwardly extending shelf portion spaced appreciably below the cross-member, on which to rest the bottom of the bicycle basket in its attached position.

7. A bicycle basket support, comprising an inverted generally U-shaped bracket made from three pieces of narrow sheet metal strip material, namely, two laterally spaced upright members and a cross-member secured to the upright members spaced downwardly from their upper ends, the upper end portions of said upright members above the cross-member defining two fixedly spaced attaching lugs in substantially vertical coplanar relation for connection with a bicycle basket, substantially horizontal elongated sheet metal arms having substantially vertically bent front end portions connected to the cross-member, said arms extending rearwardly from the cross-member and having means on the rear ends thereof for detachably fastening the same to a bicycle handle-bar, said arms being formed to channel-shaped cross-section between the front and rear ends for added strength and rigidity, means connected with the lower ends of the upright members for detachably fastening the same in rigid relation to the legs of a bicycle front fork, and a fastener clip secured on the upper rim portion of a basket and formed to receive the aforesaid attaching lugs for demountably supporting a bicycle basket on said bracket, the cross-member serving to limit downward movement of the fastener clip on said attaching lugs, whereby to support the basket to which the clip is secured.

VYTANT ALEKS.

No references cited.